United States Patent [19]

Rozanski

[11] Patent Number: 5,452,210
[45] Date of Patent: Sep. 19, 1995

[54] METHOD AND SYSTEM FOR EVALUATING GAS GENERANTS AND GAS GENERATORS

[75] Inventor: James D. Rozanski, Brigham City, Utah

[73] Assignee: Thiokol Corporation, Ogden, Utah

[21] Appl. No.: 179,727

[22] Filed: Jan. 10, 1994

[51] Int. Cl.⁶ .......................................... G01N 25/22
[52] U.S. Cl. .................... 364/424.05; 364/551.01; 364/578; 374/38; 73/861.04
[58] Field of Search ................ 364/424.05, 551, 578; 374/55, 38, 141, 143; 73/23, 860, 866.4, 861.04, 200; 149/35

[56] References Cited

U.S. PATENT DOCUMENTS

| | | | |
|---|---|---|---|
| 4,064,392 | 12/1977 | Desalu | 364/578 |
| 4,157,648 | 6/1979 | Brennan et al. | 149/35 |
| 4,203,787 | 5/1980 | Kirchoff et al. | 149/35 |
| 4,393,013 | 7/1983 | McMenamin | 73/861.04 |
| 4,436,674 | 3/1984 | McMenamin | 73/861.04 |
| 4,931,111 | 6/1990 | Poole et al. | 149/35 |
| 4,977,529 | 12/1990 | Gregg et al. | 364/578 |
| 5,201,581 | 4/1993 | Vander Heyden et al. | 374/36 |
| 5,203,205 | 4/1993 | Ookubo et al. | 73/199 |

OTHER PUBLICATIONS

Steven et al., "Computer Simulation of the Pyrotechnic Inflator for Auto Inflatable Restraint Systems", Thiokol Corp, Oct. 1980–Apr. 1982 (report).

*Primary Examiner*—Kevin J. Teska
*Assistant Examiner*—Tyrone V. Walker
*Attorney, Agent, or Firm*—Madson & Metcalf; Ronald L. Lyons

[57] ABSTRACT

A computer-implemented system and method for evaluating gas bag inflator designs are disclosed, including an inflator state machine having slots for signals corresponding to predetermined gas dynamic and heat transfer characteristics of a gas bag inflator at a specified time. Inflator state machines having one or more chambers, and zero or more deflectors, screen packs, burst disks, and vents are supported. Initial temperatures, pressures, and chamber gas contents may be specified, as may the geometry and other characteristics of gas generant pills. A controller in the state machine accesses a chemical database to obtain information about enthalpy, viscosity, and other properties of gas generant combustion products, igniter combustion products, and other compounds present within the gas bag inflator. Running the state machine produces predictions of pressure and temperature behavior within a fabricated gas bag inflator, permits elimination of gas bag inflator designs that are unlikely to meet predetermined performance goals, and provides explanations for unexpected test results of fabricated inflators.

46 Claims, 5 Drawing Sheets

METHOD AND SYSTEM FOR EVALUATING GAS GENERANTS AND GAS GENERATORS

FIELD OF THE INVENTION

The present invention relates to a method and system for evaluating a gas bag inflator, and more particularly to a method and system including a computer-implemented state machine for predicting the pressure and temperature produced over time by a gas bag inflator which includes a gas generant and a gas generator.

TECHNICAL BACKGROUND OF THE INVENTION

When properly designed and implemented, automobile air bag restraint devices can dramatically reduce the injury and loss of life caused by automobile collisions. When a collision occurs, unrestrained occupants of the colliding car are often thrown forward against the interior walls and furnishings of the car. Unrestrained occupants may also be thrown through the windshield, out of the car, and onto the road or other surroundings. In either case, the occupants may be seriously injured or killed.

An air bag properly deployed in front of each occupant may cushion or prevent impact of the occupant against anything except the cushioning of the bag. Proper air bag deployment includes inflating the air bag to a volume sufficient to cushion the occupant. The inflation must be rapid, so that the inflated air bag is in place in time to protect the occupant. The air bag should also deflate while absorbing the occupant's momentum, so that energy is expended through the deflation and the occupant does not simply rebound from the air bag. By absorbing kinetic energy from car occupants during a collision, air bags may reduce or prevent the injuries and loss of life caused by the collision.

An air bag, also known herein as a "gas bag," includes a gas generant located inside a container. When a collision occurs, an igniter is used to initiate combustion of the gas generant. As the gas generant combusts, it produces gases which increase both the temperature and pressure within the container. The increased pressure inflates a bag which is attached to the container. Thus, one performance goal in designing gas bag inflators is to provide a gas generant and a container which inflate the gas bag to a sufficient volume to cushion an occupant during collision.

Another performance goal in designing gas bag inflators is to provide an igniter, gas generant, and container which provide sufficient pressure quickly enough to be of use in cushioning car occupants. An occupant of a car traveling at 55 miles per hour is traveling at about 80 feet per second. When the car slows or stops suddenly upon collision with another object, the unrestrained occupant continues traveling forward, relative to the car, at speeds up to about 80 feet per second. Thus, if the inflated air bag is to be in place about one foot in front of the occupant's position upon collision, the bag must be inflated in about 1/80th of a second (12.5 milliseconds) after the collision.

A third performance goal in designing gas bag inflators is to provide a gas generant and container which supply sufficiently cool inflation gas to the gas bag. Known gas generants combust at temperatures as high as 4600 degrees Fahrenheit. The air bag being inflated typically is not made of materials that are good thermal insulators. Moreover, the air bag is ordinarily thin enough to pack in a folded position in the car's steering column or dashboard. Because the air bag itself does not insulate the occupant from the hot gases inside the bag when the bag is inflated, the gas temperature must be reduced to prevent the occupant from being burned by contact with the bag. If the inflation gas is too hot, it may also burn through the air bag, thereby reducing the bag's effectiveness. Some of the measures that may be taken to reduce temperature inside the inflated gas include varying the composition of the gas generant, including heat sinks in the container, altering mass flow rates within the container, and providing part or all of the container with gases other than those produced by combustion of the gas generant.

In addition to providing the bag with an acceptable pressure and temperature at an acceptable time, gas bag inflators must also pursue other goals. The gas bag inflator's size, weight, cost, reliability, stability, and other characteristics are also important. Designing and evaluating a good gas bag inflator therefore requires consideration of numerous factors, and many different designs are often considered before a design meeting predetermined performance goals is obtained.

One approach to evaluating different gas bag inflator designs is to fabricate and actuate a test inflator and measure the pressure, temperature, and other gas dynamic and heat transfer characteristics of interest. At a minimum, such fabrication testing requires mixing a quantity of gas generant, making or modifying a container, placing the gas generant in the container, placing measuring devices such as thermocouples and pressure sensors at appropriate locations in or near the container, combusting the gas generant, and reading measurements on the measuring devices.

Because it involves engineers and technicians from several different disciplines, fabrication testing is time-consuming and labor-intensive. Chemists, gas dynamicists, metallurgists, and experts from several other fields must coordinate their efforts for each fabrication test. Obtaining all the necessary parts and making all the necessary preparations typically takes much longer than the actual fabrication test and the evaluation of the test results.

Fabrication testing is also expensive because the chemical compounds, containers, and measuring equipment employed are subject to wear or destruction during each test. In general, a new quantity of the igniter composition and a new quantity of the gas generant composition must be provided for each fabrication test. Although a given container may be reusable after being cleaned, portions of the container which absorb substantial heat or which receive chemical deposits from the inflation gas mixture may need replacement after one or more fabrication tests. Moreover, the container dimensions may need to be altered from one fabrication test to the next. The measuring equipment used in fabrication tests is also subject to pressure and temperature extremes that require periodic maintenance or replacement of sensors.

Thus, it would be an advancement in the art to provide a system and method for evaluating gas bag inflators which reduces the need for fabrication testing.

It would also be an advancement in the art to provide such a system and method which predict the temperature and pressure performance of a gas bag inflator without destructive testing of gas generant compounds.

It would be an additional advancement to provide such a system and method which assist in the design of gas generants and gas generant containers to meet specified performance goals.

It would be a further advancement in the art to provide such a system and method which can be tailored to consider selected gas dynamic and heat transfer characteristics of a gas bag inflator while ignoring other characteristics.

Such a system and method are disclosed and claimed herein.

BRIEF SUMMARY OF THE INVENTION

The present invention provides a system and method for evaluating gas bag inflators by constructing and running a gas bag inflator state machine in computer memory. As defined herein, a gas bag inflator comprises a gas generant, which is a chemical composition, and a gas generator, which is a mechanical component containing the gas generant. The terms "gas generator" and "container" are used interchangeably herein.

In applying the teachings of the present invention, a gas bag inflator designer initially sets performance goals for the inflator. These goals are quantified as the pressure and temperature output of the inflator over time. Other goals, such as avoiding toxic gas generant products, may also be established.

Next, the designer specifies an inflator to evaluate against these performance goals. Specifying the inflator includes specifying a gas generant, a container, and other elements of the inflator. Specifying the gas generant includes specifying the generant's chemical composition, total mass, heat capacity, flame temperature, burn rate, flame spreading behavior, and other gas dynamic and heat transfer characteristics. Specifying the container includes specifying how many chambers are present, the volume of each chamber, the area of any ports coupling the chambers, the thermal conductivity and total heat capacity of the chamber walls, and other gas dynamic and heat transfer characteristics. The inflator may also include deflectors, screen packs, burst disks, vents, igniter compositions, other chemical compounds disposed within one or more chambers, and initial temperatures and pressures throughout the inflator. All such gas dynamic and heat transfer characteristics of the inflator are preferably specified.

The specified inflator is realized through fabrication, modeling, or both. Fabrication includes mixing a gas generant composition, building or modifying a container, placing the gas generant within the container, and sealing the container through spin-welding, bonding, or other closure methods. Fabrication produces a tangible gas bag inflator.

Modeling includes constructing a gas bag inflator state machine in computer memory. As used herein, "state machine" and "inflator state machine" are interchangeable designations. If a state machine has initial gas dynamic and heat transfer characteristics that correspond to a fabricated inflator, the changes over time in those characteristics of the state machine serve as a prediction of the changes over time in the corresponding characteristics of the fabricated inflator. However, state machines may be constructed and evaluated without any corresponding fabricated inflator, just as fabricated inflators may be made without constructing any corresponding state machine.

The inflator state machine contains a user interface module. The user interface module is in signal communication with a keyboard and a display device to permit communication between a human operator and the state machine. The state machine also includes a database module for permitting communication between the state machine and a chemical database such as the JANNAF database.

In addition, the state machine includes a plurality of slots for holding signals. In a preferred embodiment, some of the slots hold state signals that correspond to the gas dynamic and heat transfer characteristics described above. Other slots hold signals related to the accuracy of the state machine's prediction, such as a time increment specifying how far apart states are in time when the state machine runs, or a depth increment specifying how far apart in length profile points are in a container's wall when heat transfer into the wall is profiled.

The state machine also contains a controller which is in signal communication with the user interface module, the slots, and the database module. The controller maintains signals in the slots that correspond to the current state of the state machine. Initially, the controller fills selected slots with signals based on information provided by the user or the chemical database. The controller then runs the state machine by updating selected slots to model changes in the inflator over time. The controller also stores signals as appropriate, and retrieves them for analysis by the user as requested.

Once realized through fabrication or modeling, the gas bag inflator is tested. Fabricated inflators are connected to pressure and temperature sensors and the gas generant is combusted. Fabrication test results include the measurements obtained from the sensors. State machines are tested by running the state machine through a sequence of states separated by a predetermined time increment. At each step, the gas dynamic and heat transfer state of the model inflator is computed, and the state signal slots are updated accordingly. State machine test results include pressure and temperature predictions.

In either case, the test results are evaluated in view of the performance goals and the test results of other gas bag inflator designs. If the test results are acceptable, the design process concludes. If the test results do not meet the performance goals, the designer attempts to decide why not, and selects changes to make in the inflator specification. The altered inflator is then specified, realized, tested, and evaluated as described above, in a cycle which repeats until an acceptable inflator design is obtained.

Inflator designs are preferably realized and tested first as inflator state machines. Because of the expense and other disadvantages of fabrication relative to state machine construction, it is preferable to rule out designs by testing state machines rather than by testing fabricated inflators. Fabricated inflators are preferably realized and tested only if tests of the corresponding inflator state machine test provide encouraging results.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to a system and method for evaluating gas bag inflators. At a minimum, a gas bag inflator includes a single chamber and a gas generant disposed within the chamber.

Figure 1:
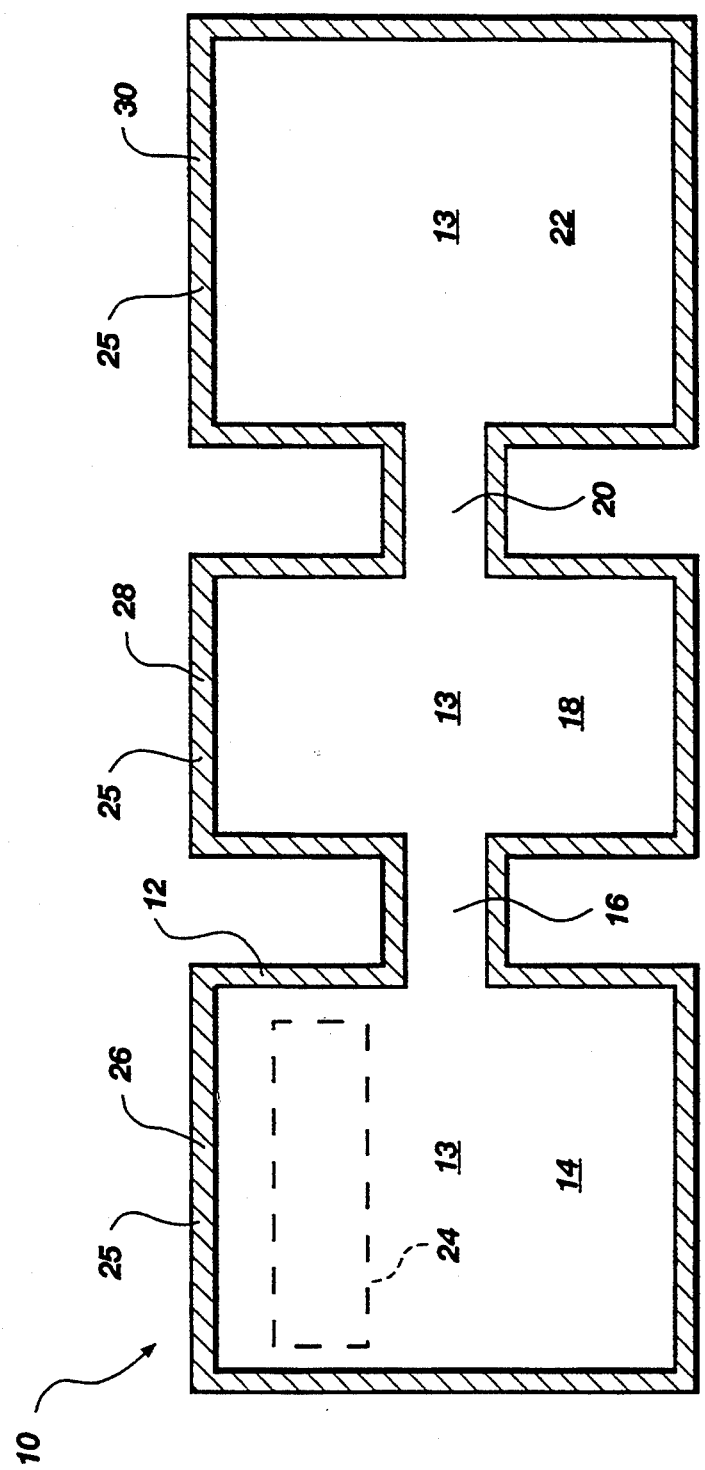
FIG. 1 is a schematic representation of a simple three-chambered gas bag inflator which may be realized through fabrication, modeling, or both according to the present invention.

An alternative gas bag inflator is denoted generally at 10 in FIG. 1. The gas bag inflator 10 includes a container 12 which defines three chambers 13, including a combustion chamber 14. The combustion chamber 14 is in fluid communication via a first port 16 with a diffusion chamber 18. The diffusion chamber 18 in turn is in fluid communication via a second port 20 with a tank chamber 22, also known simply as the "tank" 22. A gas generant 24 is disposed within the combustion chamber 14. Each chamber 13 is substantially defined by and enclosed within a chamber wall 25. Thus, the combustion chamber wall 26 defines the combustion chamber 14, the diffusion chamber wall 28 defines the diffusion chamber 18, and the tank wall 30 defines the tank 22. The walls 25 are part of the container 12.

Figure 2:
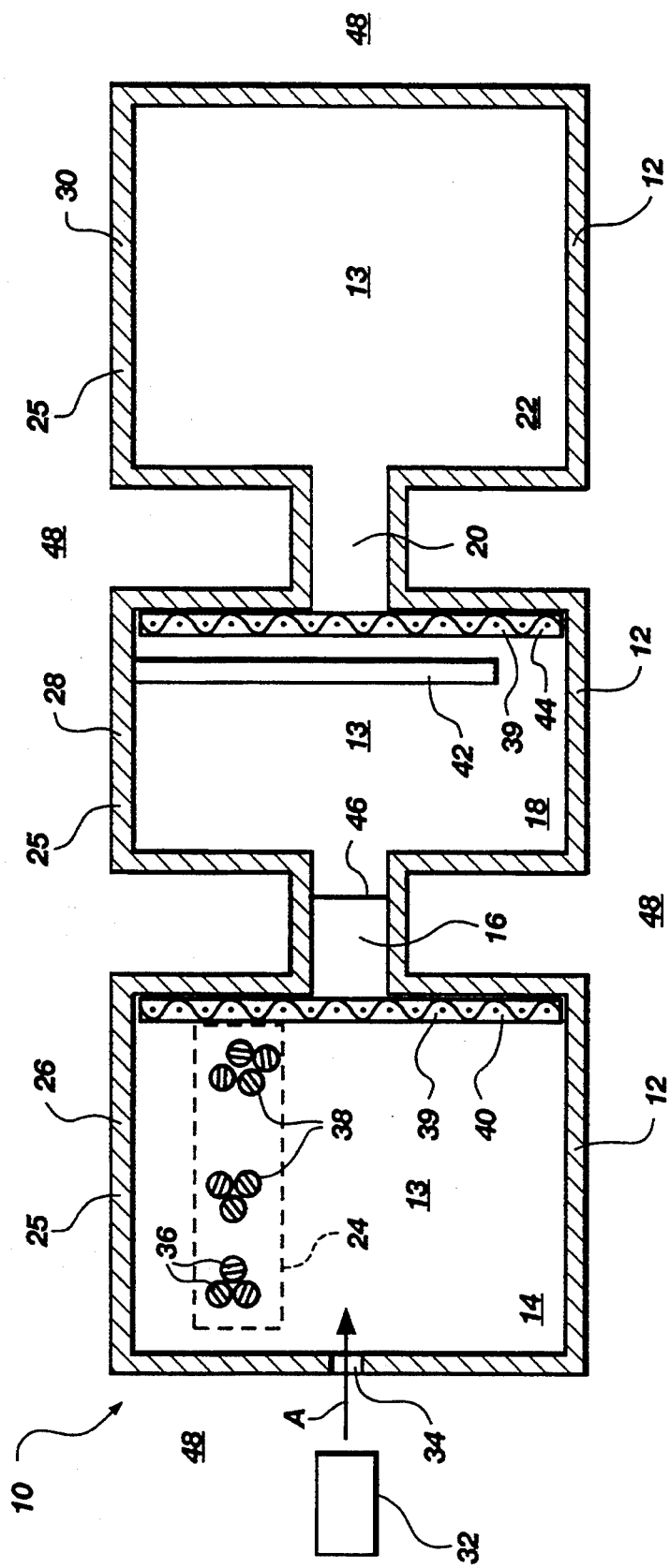
FIG. 2 is a schematic representation of a more complex three-chambered gas bag inflator illustrating an igniter, two screen packs, a deflector, a burst disk, and a plurality of gas generant pills which have a geometry and which are arranged in clusters according to the generant's flame spread characteristics.

FIG. 2 illustrates possible further additions and modifications to the design of inflator 10. An igniter 32 is disposed in fluid communication with the combustion chamber 14. Mass and thermal output from the igniter 32 enter the combustion chamber 14 via an igniter port 34 as indicated by Arrow A. The gas generant 24 indicated in general by phantom lines within the combustion chamber 14 includes pills 36 having a specified geometry and grouped in flame spread clusters 38.

Zero or more screen packs 39 may be placed within the chambers 13. For instance, a screen pack 40 is positioned adjacent the first port 16 between the combustion chamber 14 and the diffusion chamber 18. A flow deflector 42 and a second screen pack 44 are positioned in the diffusion chamber 18. A burst disk 46 blocks the port 16 between the combustion chamber 14 and the diffusion chamber 18.

It will be appreciated that screen packs 39, deflectors 42, and burst disks 46 may be positioned differently, and that more or fewer screen packs 39, deflectors 42, burst disks 46, and chambers 13 may be employed in gas bag inflators. The tank 22, which is defined by a substantially rigid wall 30, is one form of output chamber. An air bag (not shown) may also be employed as an output chamber. Moreover, one or more vents providing fluid communication between one or more chambers 13 and the ambient atmosphere may be included in alternative gas bag inflator embodiments according to the teachings of the present invention.

In operation, the gas bag inflator 10 illustrated in FIG. 2 has an initial state. In the initial state, the screen packs 39, the deflector 42, and the chamber walls 25 each have an initial temperature. Each screen pack 39, deflector 42, and wall 25 also has a particular thermal conductivity and a total heat capacity. As used herein, heat capacity has units corresponding to energy divided by mass and temperature. In the initial state, each chamber 13 also has an initial temperature and pressure. The combustion chamber 14 has an initial chemical content in the form of the gas generant 24, and other chemicals may also be present in any or all of the chambers 13.

The gas generant 24 initially has a given total mass of certain compounds whose combustion product mass fractions are known. The gas generant 24 is often pressed into pills 36 having a specified geometry. In a preferred embodiment, the pill geometry comprises cylinders capped at both ends by sections of spheres. The pills 36 are arranged in clusters 38 according to the gas generant's flame spreading behavior during combustion. The gas generant pills 36 also have a heat capacity, a thermal conductivity, an ignition temperature at which combustion begins, and a flame temperature.

The initial state of the gas bag inflator 10 is associated by convention with the time t=0, the time at which the igniter 32 is actuated. The actuated igniter 32 expels combustion products into the combustion chamber 14 as indicated by Arrow A at some mass flow rate for each compound contained in or produced by the igniter 32. The actuated igniter 32 also increases the temperature within the combustion chamber 14. Some of the heat from the actuated igniter 32 is absorbed by the gas generant 24. If a given cluster 38 of the gas generant 24 receives sufficient heat to reach the ignition temperature, that cluster 38 begins to combust.

The combustion flame spreads from the initial cluster 38 to nearby clusters 38 in the gas generant 24 as other clusters 38 reach the ignition temperature. Combustion of the gas generant 24 produces heat, increases pressure within the combustion chamber 14, and produces chemical by-products. Some of the heat is transferred to the combustion chamber wall 26, according to the heat transfer coefficient, thermal conductivity, and total heat capacity of the wall 26. Heat may eventually transfer from the outside of the chamber wall 26 into the ambient atmosphere 48.

The pressure increase in the combustion chamber 14 propagates into the diffusion chamber 18 and thence to the tank 22. The burst disk 46 bars fluid communication between the combustion chamber 14 and the diffusion chamber 18 only until the pressure differential between the chambers 14 and 18 exceeds the strength of the burst disk 46. Mass flow between the chambers 13 is restricted by the screen packs 39 and by the cross-sectional areas of the ports 16 and 20. As chemical compounds deposit or condense on a screen pack 39, the screen pack's porosity may change.

Heat from the combustion chamber 14 travels into the diffusion chamber 18, where it may be partially absorbed by the diffusion chamber wall 28, and by the deflector 42 and screen pack 44. The heat absorption rate of the deflector 42 or screen pack 44 may change, depending on the materials and geometry used, or may remain substantially constant over time.

Chemical compounds also flow between the chambers 14, 18, and 22 in response to the changing pressures and temperatures. The compounds present within the container 12 may change with time through reactions between the combustion products of the igniter 32 and gas generant 24 and the initial contents of the chambers 13. The ratio of compounds present within the container 12 will also change with time through mixing of the igniter 32, generant 24, and initial gases. Ambient air 48 or other compounds may also be drawn into the chambers 13 by the changing temperatures and pressures in the container 12.

The inflator state machine 10 of the present invention does not model an unfolding air bag. Instead, the gas bag inflator's performance is quantified as the pressure and temperature present in the tank 22 over time. One approach for obtaining pressure and temperature functions for use as design goals is to replace the air bag of an acceptable fabricated inflator by a fabricated tank, actuate the fabricated inflator, and measure the pressure and temperature in the fabricated tank. The measurements obtained may then be used as goals for the inflator 10 of the present invention.

Figure 3:
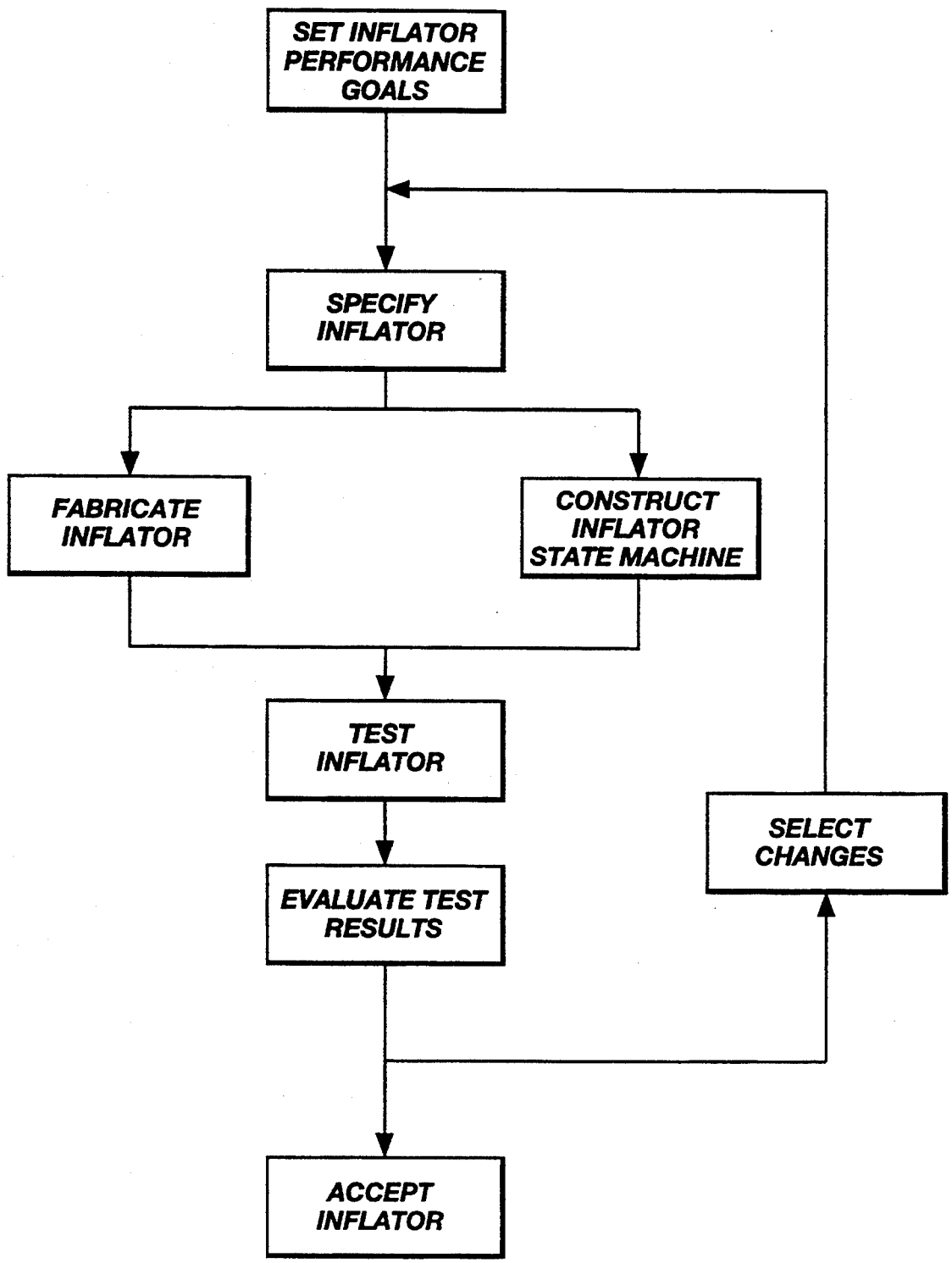
FIG. 3 is a flow diagram illustrating a gas bag inflator evaluation method according to the present invention.

As shown in FIG. 3, a gas bag inflator is designed through a process that typically involves repeated testing, evaluation, and design changes. Initially, the gas bag inflator designer sets performance goals for the inflator. Some of these goals are quantifiable as the pressure and temperature output of the inflator over time. For instance, the inflator may be required to inflate an air bag having a volume of 3600 cubic inches to a pressure of six p.s.i.g. within 20 milliseconds with a gas mixture whose inflow temperature is no higher than 800 degrees Fahrenheit. Other goals, such as avoiding toxic gas generant products, using commercially available gas generants, or constructing the chamber walls of a light weight material such as aluminum may also be established.

Next, the designer specifies an inflator to evaluate against these performance goals. At a minimum, specifying the inflator includes minimally specifying a gas generant and minimally specifying a container. Specifying the inflator preferably includes providing more than minimal specifications of the gas generant and container, also includes specifying the mass, mass flow rate, and combustion product chemical compositions of an igniter compound, and further includes specifying the initial chemical contents, pressure, and temperature of each chamber. In a presently preferred embodiment, the inflator specification also includes specification of gas dynamic and heat transfer characteristics of screen packs, deflectors, burst disks, and vents.

A minimal specification of the gas generant includes the chemical composition of the combustion products and the total mass. A preferred specification also includes the heat capacity and flame temperature of the gas generant. In a presently preferred embodiment, the generant's pill geometry, burn rate, and flame spreading behavior are also specified.

A minimal specification of the container includes the number of chambers present, the volume of each chamber, and the area of any ports coupling the chambers. Although three-chambered containers are illustrated herein, it will be appreciated that more or fewer chambers may be used. A preferred specification also includes total heat capacity of the chamber walls. In a presently preferred embodiment, the thickness, heat transfer surface area, density, and thermal conductivity of the chamber walls are also specified.

In a presently preferred embodiment, the inflator specification may also include deflectors, screen packs, burst disks, vents, igniter compositions, other chemical compounds disposed within one or more chambers, and initial temperatures and pressures throughout the inflator. Deflector specification includes the placement (chamber identification), thermal conductivity, heat transfer surface area, heat capacity, density, and thickness of each deflector. Screen pack specification includes the placement, thermal conductivity, heat capacity, density, and wire mesh geometry of each layer within the screen pack. Burst disk specification includes the placement of each disk and the pressure differential required to burst the disk. Vent specification includes the placement and area of each vent.

The specified inflator is realized through fabrication, modeling, or both. Fabrication includes mixing a gas generant composition such as sodium azide or another compound, acquiring a container by building one or by modifying an existing gas generator, placing the gas generant within a combustion chamber in the container, and sealing the container through spin-welding, bonding, or other closure methods. The container has an output chamber that is in fluid communication with the combustion chamber via a port. The output chamber may comprise a tank or an air bag. Fabrication produces a tangible gas bag inflator.

Figure 4:
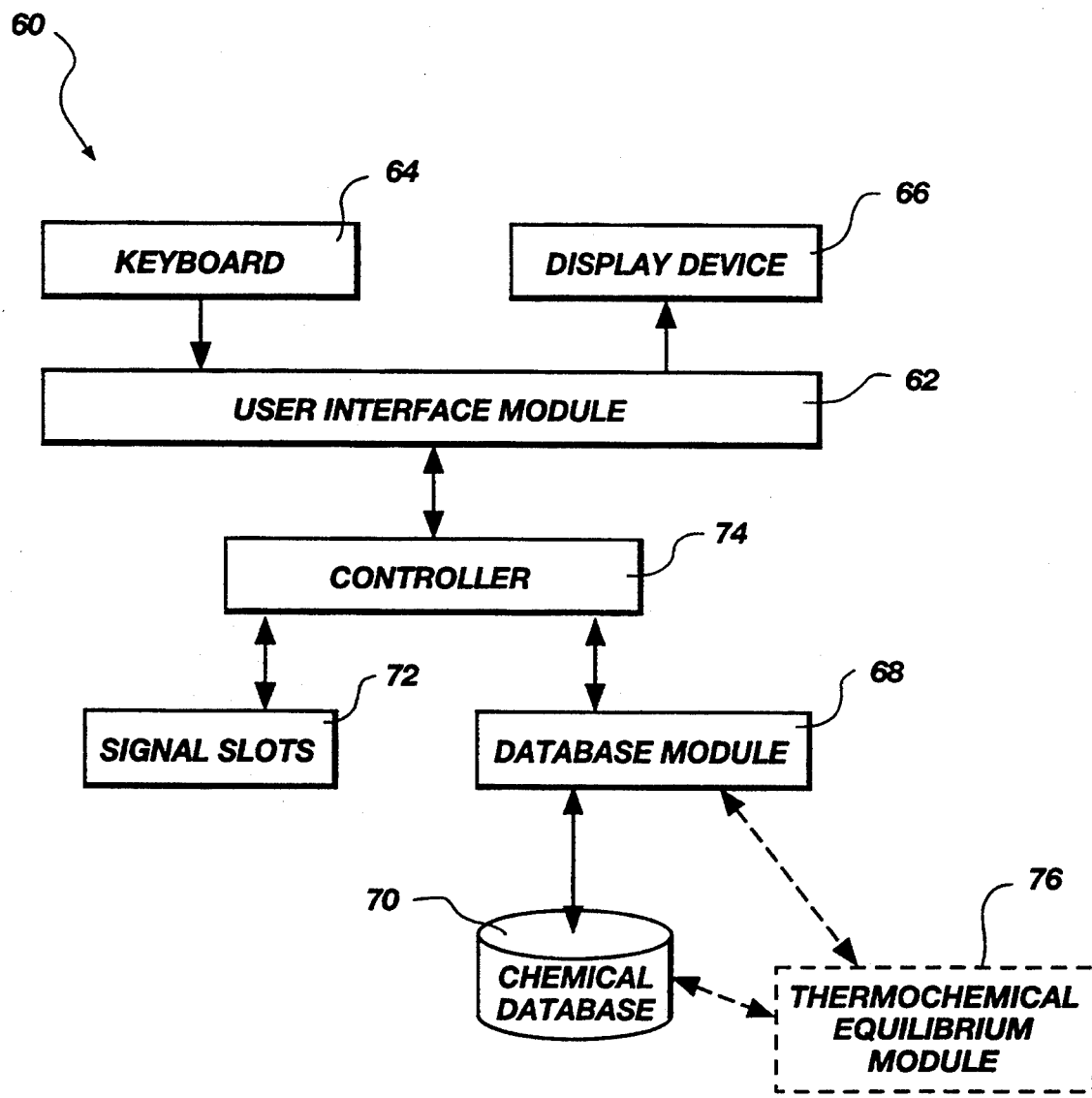
FIG. 4 is an architectural block diagram wherein inflator state machine modules are represented as blocks, data flows between modules are represented as arrows, and the additional components of an alternative embodiment are represented in phantom lines.

Modeling includes constructing a gas bag inflator state machine in computer memory. As illustrated in FIG. 4, the inflator state machine, designated generally at 60, includes a user interface module 62. The user interface module 62 is in signal communication with a keyboard 64 and a display device 66 to permit communication between a human operator and the state machine 60. In a presently preferred embodiment, the user interface module 62 includes FORTRAN code executing on a Silicon Graphics Indigo workstation under the IRIX operating system, version 4.0, and the display device 66 includes a Silicon Graphics monitor. This computer system is referred to hereinafter as the "SGI workstation." Although the user interface 62 in the presently preferred embodiment is character-oriented rather than graphical, it will be appreciated by those of skill in the art that a graphical user interface may also be employed in accordance with the teachings of the present invention.

The state machine 60 also includes a database module 68 for permitting communication between the state machine 60 and a chemical database 70. In a presently preferred embodiment, the database module 68 includes access routines implemented in FORTRAN and running on the aforementioned SGI workstation. The database 70 is preferably a database such as the JANNAF database. In the presently preferred embodiment, the database 70 includes a JANNAF database that has been enhanced by adding chemical species contained in gas generant compounds (24 in FIG. 2).

In addition, the state machine 60 includes a plurality of slots 72 for holding signals. In a presently preferred embodiment, the slots 72 are implemented as FORTRAN data structures including variables and arrays. Integers are stored in two bytes, real values are stored in eight bytes, and IEEE floating point FORTRAN 77 double precision standard numeric libraries are used. FORTRAN data structures hold state signals implemented as binary digits in the memory of the SGI workstation. Data structures are allocated in SGI workstation memory to correspond to the gas dynamic and heat transfer characteristics of the preferred specification of the inflator (10 in FIG. 2), as described above. Other data structures hold signals related to the accuracy of the state machine 60 prediction, such as a time increment specifying how far apart states are in time when the state machine runs, and cell sizing parameters. With reference to FIG. 2, cell sizing parameters specify how far apart profile points are in heat barriers when heat transfer into the heat barrier is profiled by the state machine (60 in FIG. 4). As used herein, the term "heat barrier" comprises walls 25, deflectors 42, and screen packs 39, as well as gas generant pills 24 prior to their combustion.

With reference once more to FIG. 4, the state machine 60 also contains a controller 74 which is in signal communication with the user interface module 62, the slots 72, and the database module 68. The controller 74 maintains signals in the slots 72 that correspond to the current state of the state machine 60. Initially, the controller 74 fills selected slots 72 with signals based on information provided by the user or obtained from the chemical database 70. The controller 74 then runs the state machine 60 by updating selected slots 72 to model changes in the inflator (10 in FIG. 2) over time. The controller 74 also stores signals in memory or on disk in the SGI workstation as appropriate, and retrieves the signals for analysis by the user as requested. In a presently preferred embodiment, the controller 74 is implemented as FORTRAN code running on the SGI workstation. The detailed operation of the controller 74 is described below in connection with the construction and operation of a state machine 60.

Once realized through fabrication or modeling, the gas bag inflator (10 in FIG. 2) is tested. Fabricated inflators are connected to pressure and temperature sensors and the gas generant is combusted. Fabrication test results include the measurements obtained from the sensors. Sensors may include conventional pressure transducers. Pressure may also be measured by configuring an air bag to receive the inflator output and visually inspecting the bag for sufficient inflation. Other known testing methods may also be employed.

State machines 60 are tested by running the state machine 60 through a sequence of states separated by a predetermined time increment. The running of a preferred embodiment of the state machine 60 is described below. At each step, the gas dynamic and heat transfer state of the model inflator (10 in FIG. 2) is computed, and the state signal slots 72 are updated accordingly. State machine test results include pressure and temperature predictions.

In either case, the test results are evaluated in view of the performance goals and the test results of other gas bag inflator designs. If the test results are acceptable, the design process concludes. If the test results do not meet the performance goals, the designer attempts to decide why not, and selects changes to make in the inflator specification. The altered inflator is then specified, realized, tested, and evaluated as described above, in a cycle which repeats until an acceptable inflator design is obtained.

Inflator designs are preferably realized and tested first as inflator state machines such as the state machine 60. Because of the expense and other disadvantages of fabrication relative to state machine construction, it is preferable to rule out designs by testing state machines 60 rather than by testing fabricated inflators. Fabricated inflators are preferably realized and tested only if tests of the corresponding inflator state machine test provide encouraging results.

Figure 5:
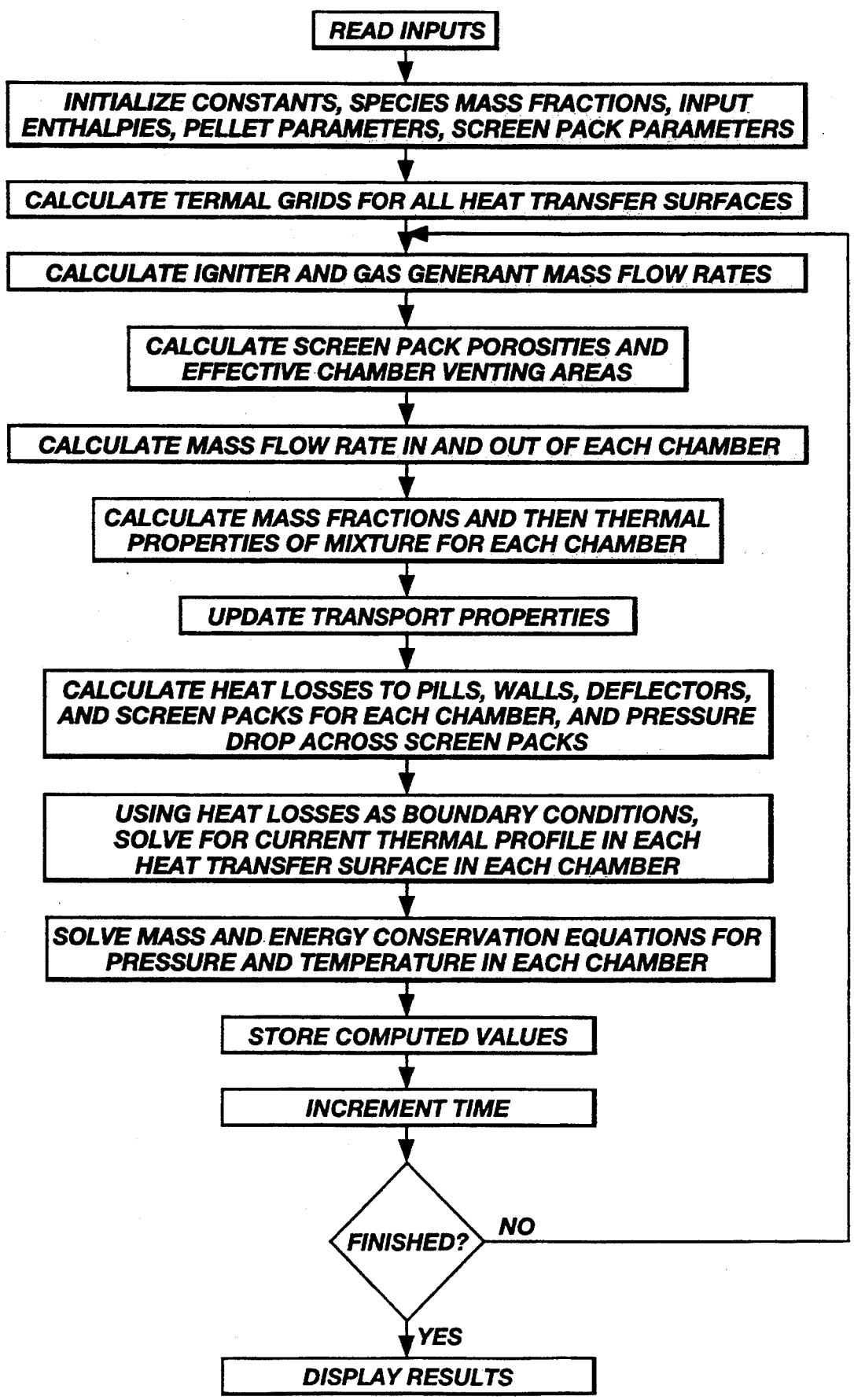
FIG. 5 is a flow diagram illustrating the construction and running operation of an inflator state machine according to the present invention.

FIG. 5 illustrates in flow chart form the construction and operation of a presently preferred inflator state machine (60 in FIG. 4). Initially, the controller (74 in FIG. 4) causes the user interface module (62 in FIG. 4) to read certain inputs from the user. The inputs are entered and transformed into corresponding signals through keyboard entry, file reading, or other methods known in the computer programming art.

It will be appreciated that the group of input parameters whose values are being read may vary according to a variety of factors. Among these factors are the number of chambers in the inflator being modeled, and the presence or absence of screen packs, deflectors, vents, and burst disks. Typical input parameters to a presently preferred embodiment are listed in Tables 1 through 9 below.

TABLE 1: Implementation Parameters total time model is to run (simulated internal time)
number of time steps skipped between writes to output store
time after which output is written for every time step
number of time steps skipped between writes for thermal profile
flag for diagnostic writes
number of solution attempts before Runge-Kutta is used
starting value of Bulirsch-Stoer sub step size
minimum allowed Bulirsch-Stoer sub step size
required Bulirsch-Stoer accuracy
Bulirsch-Stoer full step size
threshold for triggering multiplication of Bulirsch-Stoer sub step minimum, sub step size, and accuracy
factor by which Bulirsch-Stoer sub step minimum, sub step size, and accuracy are multiplied if change in pressure over time is less than threshold TABLE 2: Ambient Parameters ambient pressure outside container
ambient temperature outside container
fraction of water condensed in tank (experimental and likely to be eliminated from later preferred embodiments)
approximate burn out time of gas generant (experimental and likely to be eliminated from later preferred embodiments)

TABLE 3: Container Parameters number of chambers
unique chamber identifiers for use in associating wall, deflector, screen pack, burst disk, and vent parameters with the chambers in which they are located
initial pressure in each chamber
burst pressures for each burst disk time for each burst disk to fully open
initial temperature in each chamber
volume of each chamber
initial gas in each chamber (e.g., in hybrid inflators)

TABLE 4: Wall Heat Transfer Parameters port flow area in each chamber
heat transfer surface area in each chamber
flow path length in each chamber
constant a used in heat transfer coefficient correlation
constant b used in heat transfer coefficient correlation
size of first wall cell in each chamber
wall cell sizing parameter for each chamber
density of walls in each chamber (one value per chamber)
heat capacity of walls in each chamber (one value per chamber)
thermal conductivity of walls in each chamber (one value per chamber)
wall thickness (one value per chamber)
temperature for back side heat transfer in each chamber, the back side being the wall opposite the wall adjoining the chamber
heat transfer coefficient for back side heat transfer in each chamber TABLE 5: Deflector Heat Transfer Parameters port flow area for each chamber containing a deflector
heat transfer surface area of each deflector
flow path length along each deflector
constant a used in heat transfer coefficient correlation
constant b used in heat transfer coefficient correlation
size of first deflector cell in each deflector
deflector cell sizing parameter for each deflector
density of each deflector
heat capacity of each deflector
thermal conductivity of each deflector
thickness of each deflector
temperature for back side heat transfer from each deflector
heat transfer coefficients for back side heat transfers TABLE 6: Screen Pack Heat Transfer Parameters total number of layers in each screen pack
size of surface cell in screen wire
cell sizing parameter
temperature for back side heat transfer
heat transfer coefficient for back side heat transfer
wire density in each layer
wire thermal conductivity in each layer
wire diameter in each layer
wire mesh size in each layer
frontal area of each layer
screen thickness of each layer
constant a used in heat transfer coefficient correlation, for each layer
constant b used in heat transfer coefficient correlation, for each layer
constant used in porosity correlation for each layer
minimum porosity of each layer
number of screens in each layer TABLE 7: Vent Area Parameters number of tabular entries for each chamber
coefficient of discharge for each chamber
hole diameter of hole through which igniter combustion products enter combustion chamber
table of vent area as a function of time, for each chamber

TABLE 8: GENERANT PILL PARAMETERS radius of cylindrical portion of pill
radius of curvature of end cap portions of pill
height of cylindrical portion of pill
number of pill clusters
flag to enable-disable pill heat transfer
pill density
generant flame temperature
thermal conductivity of pill
heat capacity of pills
burn rate constant
burn rate exponent
temperature sensitivity parameter for burn rate
burn rate reference temperature
initial generant temperature
for each pill group, the number of pills per group
for each pill group, the time at which the pill group ignites
number of species in generant combustion products
table giving species, phases, and mass fractions for generant combustion products

TABLE 9: IGNITER PARAMETERS number of tabular entries
flame temperature
igniter mass flow rate table
number of species igniter combustion products
table giving species, phases, and mass fractions for igniter combustion products With further reference to FIG. 5, after the inputs are read the state machine controller (74 in FIG. 4) performs certain initializations. During this step arrays are initialized to zero, physical constants are initialized, and constants such as species coefficients and ambient gas properties are computed from the inputs provided and initialized accordingly. Also, species mass fractions are computed for the gaseous portion of the igniter and generant combustion products.

The properties of the initial chamber gases and the incoming igniter and generant species are computed by summing the property-mass fraction products. For example, the enthalpy of each generant species is computed from the JANNAF database (70 in FIG. 4) as a function of flame temperature and multiplied by its mass fraction. These products are then summed to obtain the generant input enthalpy.

In addition, the pellet parameters such as volume and surface area as functions of burnback over time are computed by using geometric formulas, and stored internally as arrays or tables. The screen pack parameters such as wire volume and initial porosity are also computed by using geometric formulas, and stored internally for later retrieval.

As shown in FIG. 5, after these initializations are performed, thermal grids are calculated for all heat transfer barriers. One thermal grid is calculated for each chamber's wall (25 in FIG. 2), for each deflector (42 in FIG. 2), for each screen pack (39 in FIG. 2), and for the pill geometry of the gas generant (24 in FIG. 2) prior to ignition. In an alternative embodiment, multiple thermal grids are calculated for each chamber, thereby distinguishing between the walls of a given chamber. The resolution of the thermal grid depends on the cell sizing parameter specified by the user. A thermal profile of a wall, deflector, or other heat transfer barrier at a given point in time includes the temperature of the heat transfer barrier at the surface and at points within the barrier at depths which are controlled by the user-specified cell sizing parameter.

As shown in FIG. 5, the mass flow rates of the igniter and the gas generant are calculated. This is done according to the relationship $$(1) \quad m = \rho_g r A_b$$

where $\rho_G$ is the generant density, r is the burn rate, and $A_b$ is the area of the burning surface. In the case of the igniter, the mass flow rate m may alternatively be input as a time-dependent table.

Next, the screen pack porosities are calculated. A screen pack (39 in FIG. 2) is an assembly of screen layers of possibly various materials and mesh sizes. Screen pack porosity is calculated according to the relationship $$(2) \quad p = p_{geometric} - (p_{geometric} - p_{minimum}) \left( \frac{1 - e^{bt}}{1 - e^{bto}} \right)$$

Here, $p_{geometric}$ is the initial screen pack porosity calculated from the pack's wire geometry, $p_{minimum}$ is the minimum expected porosity due to slag deposition, b is an empirically determined constant, and $t_o$ is the time of generant burnout. The effective venting area of each chamber is then calculated as the product of the port areas and the screen pack porosities for the screen packs and ports adjoining or within the chamber.

As shown in FIG. 5, the mass flow rate in and out of each chamber (13 in FIG. 2) is calculated. Back flow is allowed. For flow out of a chamber, for instance, this calculation is performed for choked flow according to the relationship $$(3) \quad m = \left( \frac{2P\rho\gamma}{\gamma + 1} \right)^{1/2} A_v \left( \frac{\gamma + 1}{2} \right)^{-\frac{1}{\gamma - 1}}$$

where P is pressure, $\rho$ is gas density, $\gamma$ is the specific heat ratio, and $A_v$ is the vent area.

For unchoked flow, mass flow rate is calculated according to the relationship $$(4) \quad m = \left( \frac{2P_i\rho\gamma}{\gamma - 1} \right)^{\frac{1}{2}} A_v \left( \frac{P_{i+1}}{P_i} \right)^{\frac{1}{\gamma}} \left[ 1 - \left( \frac{P_{i+1}}{P_i} \right)^{\frac{\gamma - 1}{\gamma}} \right]^{\frac{1}{2}}$$

where $P_i$ is the pressure in the upstream chamber from which mass is flowing, $P_{i+1}$ is the pressure in the downstream chamber into which mass is flowing, $\rho$ is gas density, $\gamma$ is the specific heat ratio, and $A_v$ is the vent area, and where the following constraint holds:

$$(5) \quad P_{i+1} > \frac{P_i}{\left( \frac{\gamma + 1}{2} \right)^{\frac{\gamma}{\gamma - 1}}}$$

The mass fractions of the individual species in the mixture within each chamber are calculated by dividing the mass of each of the species by the total mass in the chamber. In an alternative embodiment, the mass fractions reflect chemical reactions additional to the combustion of the gas generant and igniter. For instance, as the gases flow through a screen pack, some species may be cooled enough to change phase, or some species may react with the screen pack material to form new products. In this alternative embodiment, the controller (74 in FIG. 4) causes the database module (68 in FIG. 4) to access the chemical database (70 in FIG. 4) and a thermochemical equilibrium module (76 in FIG. 4) to determine what chemical products arise in response to such chemical reactions. The controller then incorporates this information in the calculation of the mixture's mass fractions. This alternative embodiment is presently not preferred because the time required to perform these additional calculations excessively lengthens the time a user must wait for the state machine (60 in FIG. 4) to produce pressure and temperature predictions for many inflator designs.

Next, the thermal properties of the mixture are calculated for each chamber. These thermal properties include enthalpy, heat capacity, specific heat ratio and gas constant, and are calculated by summing the property-mass fraction products of the individual species. The properties of the individual species are calculated from the JANNAF database at the chamber gas temperature.

As illustrated in FIG. 5, the transport properties of the mixture are calculated. These transport properties include the thermal conductivity and viscosity of the mixture. These properties are calculated using the JANNAF database along with the species mass fractions and temperature in a given chamber.

The heat losses to the gas generant pills (36 in FIG. 2), walls (25 in FIG. 2), deflectors (42 in FIG. 2), and screen packs (39 in FIG. 2) are calculated as the product of a heat transfer coefficient and the difference in temperature between the chamber gas and the heat transfer surface. The heat transfer coefficient is calculated from $$N_{St} N_{Pr} = a N_{Re}^b$$

where $N_{St}$ is the Stanton number, $N_{Pr}$ is the Prandtl number, $N_{Re}$ is the Reynolds number, and a,b are geometry dependent constants. Heat transfer coefficients are calculated for all heat transfer surfaces (generant pills, chamber walls, screen packs, and flow deflectors) based on the flow velocities and transport properties of the chamber gases and the geometry of the heat transfer surface. The geometry of a screen pack includes the specific geometries of the various screen wires utilized.

In the case of a screen pack (39 in FIG. 2), a pressure drop is calculated according to the relationship $$(7) \quad \Delta P = \frac{m^2}{2\rho(pA_{fr})^2} \left[ (1 + p)^2 \left( \frac{PT_2}{T_1(P - \Delta P)} - 1 \right) + \frac{fpA_{ht}}{pA_{fr}} \left( \frac{1}{2\rho} + \frac{RT_2}{2(P - \Delta P)} \right) \right]$$

where m is the mass flow rate, $\rho$ is the density of gas, p is the screen pack porosity, $A_{Fr}$ is the screen pack frontal area, $T_1$ is the temperature in the upstream (higher pressure) chamber, $T_2$ is temperature in the downstream (lower pressure) chamber, P is pressure, f is the friction coefficient, and $A_{ht}$ is the area of the heat transfer surface.

Using the heat losses as boundary conditions, thermal profiles are calculated for each barrier, accounting for the specific properties of the materials used in the barrier. Barriers include walls (25 in FIG. 2), gas generant (24 in FIG. 2), flow deflectors (42 in FIG. 2), and screen packs (39 in FIG. 2). This calculation is performed by using the Crank-Nicolson mixed time level method to solve the equation $$\frac{\partial T}{\partial t} = \frac{k}{\rho c} \frac{\partial^2 T}{\partial y^2} \tag{8}$$

where T is temperature, t is time, k is the barrier's thermal conductivity, $\rho$ is barrier density, c is barrier heat capacity, and y is depth within the barrier. The state machine (60 in FIG. 4) allows for heat transfer at the back side of the thermal profile grid, such as transfer from the exterior surface of the chamber walls (25 in FIG. 2) into the ambient environment (48 in FIG. 2).

Next, the mass and energy conservation equations are solved to obtain a predicted pressure and temperature in each chamber (14, 18, and 22 in FIG. 2). These equations are:

$$\frac{d(\rho V)}{dt} = m_{in} - m_{out} \tag{9}$$

$$\frac{d(\rho V e)}{dt} = (mH)_{in} - (mH)_{out} - \Sigma(QA) - P\frac{dV}{dt} \tag{10}$$

where m is the mass flow rate, H is the enthalpy, V is the chamber's volume, e is the energy, Q is the heat flux, A is surface area within the chamber, P is pressure, the summation is taken over all walls, deflectors, screens, and pills (that is, all thermal barriers) having a surface in the chamber, $\rho$ is the density of the chamber gas, and the subscripts in and out denote flow into and out of the chamber, respectively. The volume of a chamber may change over time as generant pills inside the chamber combust.

Equations (9) and (10) are solved simultaneously by application of the conventional Bulirsch-Stoer numeric method with parameters supplied by the user (see Table 1). The Bulirsch-Stoer method of the presently preferred embodiment has proven very robust, but it will be appreciated that other numeric methods may also be employed. Equations (9) and (10) are solved once for each chamber (13 in FIG. 2).

Computed values for the pressure and temperature at the current time value are stored to SGI workstation computer memory, to disk files, or to other conventional storage media. Selected thermal profiles, mass flow rates, heat flux, effective flow areas, or other gas dynamic and heat transfer characteristics of the inflator state machine (60 in FIG. 4) may also be stored. Then the current time within the inflator state machine (60 in FIG. 4) is incremented by the user-specified time increment. If the incremented time exceeds the user-specified total time the state machine is to run, the predicted pressure, predicted temperature, and other stored results are displayed on the display device (66 in FIG. 4).

Otherwise, the previous steps are repeated as indicated in FIG. 5, with the new state calculations being based on the previous state and on the incremented time value.

The steps illustrated in FIG. 5 correspond to the Construct Inflator State Machine and Test Inflator steps shown in FIG. 3. As FIG. 3 illustrates, the temperature and pressure predictions displayed after the inflator state machine (60 in FIG. 4) finishes running are evaluated by the gas bag inflator designer. Changes to the design may follow, as may the fabrication of corresponding inflators, the construction of other inflator state machines, or some combination of these steps, according to the teachings of FIG. 3 and the present invention.

In summary, inflator state machines are used in accordance with the teachings of the present invention to design gas bag inflators. A designer begins with a set of performance goals specifying the pressure and temperature outputs of the inflator as a function of time. An initial container design is specified. A state machine having the specified initial gas dynamic and heat transfer characteristics is then constructed and run, providing a prediction of the pressure and temperature over time that will be provided by an inflator fabricated according to the initial design specification. If the predicted pressure and temperature are acceptable or nearly so, an inflator may be fabricated based on the state machine, and tested to verify the prediction. Alternatively, a new state machine may be constructed having altered characteristics. Depending on the performance results predicted by running the new state machine, an inflator may be fabricated, yet another state machine may be constructed, or both may occur. In this way, the state machine may be employed to rule out inflator designs that are unlikely to satisfy the predetermined performance goals, thereby reducing the need for fabricating inflators to test.

In addition to designing entire new inflators, the state machine of the present invention is also used to evaluate modifications to particular inflator elements. For instance, the state machine may be used to predict whether a potential gas generant composition will provide acceptable pressures when combusted in a previously known container. The state machine may also be used to evaluate changes in gas generant pill geometry, total gas generant mass employed, effects of deflectors and screen packs, heat transfer effects of different wall materials, and many other changes in a given inflator's characteristics without requiring fabrication of an inflator to test each and every change.

Moreover, state machines of the present invention may be used to obtain possible reconstructions of anomalous or unexpected fabrication test results. Unexpected test results arise from causes that are sometimes difficult to reproduce experimentally in fabrication tests until the causes are known. Such causes include flame spreading effects, gas generant pill break-up, heat transfer effects on pressure and temperature, changes in screen pack porosity due to slag deposition, and the effect of condensing vapors on tank performance. By postulating possible causes, constructing and running state machines that reflect such causes, and comparing the state machines results with the fabrication test results, designers may narrow the range of possible explanations for the unexpected fabrication test results.

The invention may be embodied in other specific forms without departing from its spirit or essential characteristics. The described embodiments are to be considered in all respects only as illustrative and not restrictive. Any explanations provided herein of the scientific principles employed in operating the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for evaluating a gas bag inflator, the method comprising the steps of:
   (a) constructing in computer memory a gas bag inflator state machine, the state machine including slots for receiving and holding signals corresponding to predetermined gas dynamic and heat transfer characteristics of the gas bag inflator at a specified time, the state machine also including a controller for retrieving signals from the slots and transmitting signals to the slots to thereby effect state transitions;
   (b) computing pressure and temperature for a specified time at one or more selected locations within the gas bag inflator utilizing the state machine; and
   (c) transmitting to a display device signals corresponding to the computed pressure and temperature.

2. The method of claim 1, wherein said step of constructing in computer memory a gas bag inflator state machine comprises constructing an inflator state machine having a plurality of chambers connected by ports, each chamber being defined by a wall substantially surrounding a volume, and at least one of the chambers contains a gas generant adjacent an igniter, and the igniter capable of igniting combustion of the gas generant.

3. The method of claim 2, wherein said step of constructing a state machine further comprises the steps of:
   allocating slots for signals corresponding to the mass and identities of any compounds present in each chamber, including the gas generant;
   allocating slots for signals corresponding to the mass, identity, and mass flow rate of the igniter;
   allocating slots for signals corresponding to the temperature and pressure within each chamber;
   allocating slots for signals corresponding to the volume of each chamber; and
   allocating slots for signals corresponding to the area of each port.

4. The method of claim 2, wherein each port connects two chambers, each chamber is connected to at least one other chamber by a port, and wherein the method comprises the additional step of allocating slots for signals indicating which chambers are connected by which ports.

5. The method of claim 2, wherein the gas bag inflator has a plurality of chambers, and wherein said step of computing pressure and temperature further comprises the step of computing the mass flow rate in and out of each chamber.

6. The method of claim 5, wherein said step of constructing a state machine further comprises the step of allocating a slot for a signal corresponding to the porosity of a screen pack positioned adjacent a port within the gas bag inflator, and wherein said step of computing the mass flow rate includes computing an effective port area and a pressure drop based on screen pack porosity.

7. The method of claim 5, wherein said step of constructing a state machine further comprises the step of allocating a slot for a signal corresponding to the strength of a burst disk adjacent a port, and wherein said step of computing the mass flow rate includes computing the pressure differential between two chambers, the flow rate between the two chambers being zero until the pressure differential exceeds the strength of the burst disk.

8. The method of claim 2, wherein said step of constructing a state machine further comprises the step of allocating slots for signals corresponding to the thermal conductivity, heat capacity, and density of the gas generant, and wherein said step of computing pressure and temperature further comprises the step of computing the heat transfer into the gas generant prior to combustion of the gas generant.

9. The method of claim 2, wherein said step of constructing a state machine further comprises the step of allocating slots for signals corresponding to the flame spread and burn rate of the gas generant, and wherein said step of computing pressure and temperature further comprises the step of computing the mass and energy contributions from combustion of the gas generant.

10. The method of claim 2, wherein said step of constructing a state machine further comprises the step of allocating slots for signals corresponding to the thermal conductivity, heat capacity, density, thickness, and heat transfer surface area of each chamber wall, and wherein said step of computing pressure and temperature further comprises the step of profiling the heat transfer into each chamber wall at a plurality of depths within the chamber wall.

11. The method of claim 2, wherein said step of constructing a state machine further comprises the step of allocating slots for signals corresponding to the thermal conductivity, heat capacity, density, thickness, and heat transfer surface area of a deflector positioned within one of the chambers of the gas bag inflator, and wherein said step of computing pressure and temperature further comprises the step of profiling the heat transfer into the deflector.

12. The method of claim 2, wherein said step of constructing a state machine further comprises the step of allocating slots for signals corresponding to the thermal conductivity, heat capacity, and geometry of a screen pack positioned within one of the chambers of the gas bag inflator, and wherein said step of computing pressure and temperature further comprises the step of profiling the heat transfer into the screen pack.

13. The method of claim 1, wherein said step of computing pressure and temperature comprises the steps of:
   retrieving signals from a plurality of slots allocated in computer memory;
   calculating selected gas dynamic and heat transfer characteristics of the gas bag inflator for a selected time; and
   repeating said retrieving and calculating steps for a plurality of selected times separated from one another by a predetermined time increment.

14. A method for evaluating a gas bag inflator in view of predetermined temperature and pressure performance goals, the gas bag inflator including a container and a gas generant, the method comprising the steps of:
   (a) mixing a gas generant composition;

(b) acquiring a container having a combustion chamber and an output chamber in fluid communication with the combustion chamber via a ports the container also having in at least one chamber a heat barrier selected from the group consisting of a screen pack and a deflector;
(c) placing a gas generant in the combustion chamber;
(d) initiating combustion of the gas generant;
(e) measuring the temperature and pressure in the output chamber at selected times and comparing the measured temperature and pressure with the predetermined temperature and pressure performance goals;
(f) constructing a state machine in a computer, the state machine including state signals which correspond to gas dynamic and heat transfer characteristics of a gas bag inflator container and gas generant;
(g) running the state machine to thereby obtain temperature and pressure signals based on the state signals and updating state signals to reflect heat transfer into the heat barrier; and
(h) analyzing the temperature and pressure signals in view of the temperature and pressure measured during said step (e) and the predetermined temperature and pressure performance goals to obtain an assessment of the impact of changes in the gas bag inflator corresponding to changes in the state signals.

15. The method of claim 14, wherein said steps (f) through (h) precede said steps (a) through (e).

16. The method of claim 14, wherein said steps (a) through (e) precede said steps (f) through (h).

17. The method of claim 16, wherein said analyzing step (h) is followed by the steps of:
(j) acquiring a changed container having gas dynamic and heat transfer characteristics based on the assessment made during said analyzing step; and
(k) repeating said steps (a) and steps (c) through (e) with the changed container.

18. The method of claim 16, wherein said analyzing step (h) is followed by the steps of:
(m) mixing a changed gas generant having gas dynamic and heat transfer characteristics based on the assessment made during said analyzing step; and
(n) repeating said steps (b) through (e) with the changed gas generant.

19. The method of claim 14, wherein said acquiring step (b) comprises acquiring a container having a combustion chamber, a diffusion chamber in fluid communication with the combustion chamber via a first port, and an output chamber in fluid communication with the diffusion chamber via a second port, and said running step (g) comprises updating state signals to reflect mass transfer between the combustion chamber and the diffusion chamber, and mass transfer between the diffusion chamber and the output chamber.

20. The method of claim 14, wherein said running step (g) includes updating state signals to reflect heat transfer into the container.

21. The method of claim 14, wherein said acquiring step (b) comprises acquiring a container having a screen pack in at least one chamber, and wherein said running step (g) includes updating state signals to reflect changes in the porosity of the screen pack and the pressure drop across the screen pack.

22. A computer-based system for evaluating a gas bag inflator, the system comprising:

means for measuring the effective pressure output of the gas bag inflator;
a keyboard for generating signals corresponding to predetermined gas dynamic and heat transfer characteristics of the gas bag inflator;
a gas bag inflator state machine in computer memory, the state machine including slots for receiving and holding signals corresponding to predetermined gas dynamic and heat transfer characteristics of the gas bag inflator at a specified time, the state machine also including signal generators for generating signals transmittable to the slots to thereby effect state transitions, the state machine also including a computational pill burnback module capable of providing the total surface area of a gas generant in the gas bag inflator at a given time; and
a display for displaying values corresponding to state machine signals.

23. The system of claim 22, wherein said means for measuring the effective pressure output comprises a pressure sensor from which a numeric pressure value may be obtained.

24. The system of claim 22, wherein said means for measuring the effective pressure output comprises a gas bag disposed for visual inspection and also disposed to receive pressure from the gas bag inflator.

25. The system of claim 24, wherein said pill burnback module comprises a slot for a signal Corresponding to gas generant pill burnback rate.

26. The system of claim 25, wherein said pill burnback module further comprises a slot for a signal corresponding to the pressure acting on the gas generant pills.

27. The system of claim 24, wherein said pill burnback module comprises:
a burn rate slot;
a pill count slot;
a pill cylinder length slot;
a pill cylinder radius slot;
a pill cap curvature slot; and
a burnback computation engine capable of computing mass and energy contributions over time from combustion of gas generant pills based on said burn rate, count, length, radius, and curvature slots, said engine also capable of transmitting signals to said state machine corresponding to the computed mass and energy contributions.

28. A method for evaluating a gas bag inflator in view of predetermined temperature and pressure performance goals, the gas bag inflator including a container and a gas generant, the method comprising the steps of:
(a) mixing a gas generant composition;
(b) acquiring a container having a combustion chamber and an output chamber in fluid communication with the combustion chamber via a port, the container also having a screen pack in at least one chamber;
(c) placing a gas generant in the combustion chamber;
(d) initiating combustion of the gas generant;
(e) measuring the temperature and pressure in the output chamber at selected times and comparing the measured temperature and pressure with the predetermined temperature and pressure performance goals;
(f) constructing a state machine in a computer, the state machine including state signals which correspond to gas dynamic and heat transfer characteristics of a gas bag inflator container and gas generant;

(g) running the state machine to thereby obtain temperature and pressure signals based on the state signals and updating state signals to reflect changes in the porosity of the screen pack and the pressure drop across the screen pack; and (h) analyzing the temperature and pressure signals in view of the temperature and pressure measured during said step (e) and the predetermined temperature and pressure performance goals to obtain an assessment of the impact of changes in the gas bag inflator corresponding to changes in the state signals.

29. The method of claim 28, wherein said steps (f) through (h) precede said steps (a) through (e).

30. (added) The method of claim 28, wherein said steps (a) through (e) precede said steps (f) through (h).

31. (added) The method of claim 30, wherein said analyzing step (h) is followed by the steps of:

(j) acquiring a changed container having gas dynamic and heat transfer characteristics based on the assessment made during said analyzing step; and (k) repeating said step (a) and said steps (c) through (e) with the changed container.

32. The method of claim 30, wherein said analyzing step (h) is followed by the steps of:

(m) mixing a changed gas generant having gas dynamic and heat transfer characteristics based on the assessment made during said analyzing step; and (n) repeating said steps (b) through (e) with the changed gas generant.

33. The method of claim 28, wherein said acquiring step (b) comprises acquiring a container having a combustion chamber, a diffusion chamber in fluid communication with the combustion chamber via a first port, an output chamber in fluid communication with the diffusion chamber via a second port, and a screen pack in at least one chamber, and said running step (g) comprises updating state signals to reflect mass transfer between the combustion chamber and the diffusion chamber, and mass transfer between the diffusion chamber and the output chamber.

34. The method of claim 28, wherein said running step (g) includes updating state signals to reflect heat transfer into the container.

35. A computer comprising:

a memory which contains a gas bag inflator state machine for evaluating a gas bag inflator, said gas bag inflator state machine including slots for receiving and holding signals corresponding to predetermined gas dynamic and heat transfer characteristics of the gas bag inflator at a specified time, said state machine also including a controller for retrieving signals from said slots and transmitting signals to said slots to thereby effect state transitions, said state machine including means for computing pressure and temperature for a specified time at one or more selected locations within the gas bag inflator; and a display device including means for receiving signals from said state machine corresponding to the computed pressure and temperature.

36. The computer of claim 35, wherein said state machine comprises a plurality of chambers connected by ports, each said chamber being defined by a wall substantially surrounding a volume, and at least one of said chambers containing a gas generant adjacent an igniter, said igniter being capable of igniting combustion of said gas generant.

37. The computer of claim 36, wherein said state machine comprises:

slots for signals corresponding to the mass and identities of any compounds present in each chamber, including said gas generant;

slots for signals corresponding to the mass, identity, and mass flow rate of said igniter;

slots for signals corresponding to the temperature and pressure within each chamber;

slots for signals corresponding to the volume of each chamber; and slots for signals corresponding to the area of each port.

38. The computer of claim 36, wherein each port connects two chambers and each chamber is connected to at least one other chamber by a port.

39. The computer of claim 36, wherein said state machine has a plurality of chambers is capable of computing the mass flow rate in and out of each chamber.

40. The computer of claim 39, wherein said state machine further comprises a slot for a signal corresponding to the porosity of a screen pack positioned adjacent a port connecting two of said chambers, and said state machine is capable of computing an effective port area and a pressure drop based on screen pack porosity.

41. The computer of claim 39, wherein said state machine further comprises a slot for a signal corresponding to the strength of a burst disk adjacent a port connecting two of said chambers, and said state machine is capable of computing the pressure differential between said two chambers, the flow rate between said two chambers being zero until the pressure differential exceeds the strength of the burst disk.

42. The computer of claim 36, wherein said state machine further comprises slots for signals corresponding to the thermal conductivity, heat capacity, and density of said gas generant, and said state machine is capable of computing the heat transfer into said gas generant prior to combustion of said gas generant.

43. The computer of claim 36, wherein said state machine further comprises slots for signals corresponding to the flame spread and burn rate of said gas generant, and said state machine is capable of computing the mass and energy contributions from combustion of said gas generant.

44. The computer of claim 36, wherein said state machine further comprises slots for signals corresponding to the thermal conductivity, heat capacity, density, thickness, and heat transfer surface area of each chamber wall, and said state machine is capable of profiling the heat transfer into each chamber wall at a plurality of depths within the chamber wall.

45. The computer of claim 36, wherein said state machine further comprises slots for signals corresponding to the thermal conductivity, heat capacity, density, thickness, and heat transfer surface area of a deflector positioned within one of said chambers, and said state machine is capable of profiling the heat transfer into said deflector.

46. The computer of claim 36, wherein said state machine further comprises slots for signals corresponding to the thermal conductivity, heat capacity, and geometry of a screen pack positioned within one of said chambers, and said state machine is capable of profiling the heat transfer into the screen pack.

* * * * *